US005546130A

United States Patent [19]
Hackett et al.

[11] Patent Number: 5,546,130
[45] Date of Patent: Aug. 13, 1996

[54] METHOD AND APPARATUS FOR FORMING A VIDEO SIGNAL USING MOTION ESTIMATION AND SIGNAL PATHS WITH DIFFERENT INTERPOLATION PROCESSING

[75] Inventors: Andrew Hackett, Klingenthal, France; Michael Knee, Petersfield, United Kingdom; Michel Kerdranvat, Bischoffsheim; Nadine Bolender, Strasbourg, both of France

[73] Assignee: Thomson Consumer Electronics S.A., Courbevoie, France

[21] Appl. No.: 316,138

[22] Filed: Sep. 30, 1994

[30] Foreign Application Priority Data

Oct. 11, 1993 [EP] European Pat. Off. .............. 93402506
Nov. 2, 1993 [EP] European Pat. Off. .............. 93117671

[51] Int. Cl.$^6$ ........................................... H04N 7/01
[52] U.S. Cl. ........................ 348/447; 348/459; 348/910
[58] Field of Search ................................. 348/447, 699, 348/701, 452, 448, 459, 910; H04N 7/01

[56] References Cited

U.S. PATENT DOCUMENTS

| | | | |
|---|---|---|---|
| 4,891,701 | 1/1990 | Shikina et al. | 348/699 |
| 4,941,045 | 7/1990 | Birch | 348/448 |
| 4,967,271 | 10/1990 | Campbell et al. | 348/701 |
| 5,134,480 | 7/1992 | Wang et al. | 348/452 |
| 5,410,356 | 4/1995 | Kikuchi et al. | 348/699 |
| 5,412,436 | 5/1995 | Christopher | 348/701 |

FOREIGN PATENT DOCUMENTS

| | | | |
|---|---|---|---|
| 0294961 | 12/1988 | European Pat. Off. | H04N 7/01 |
| 6561561 | 9/1993 | European Pat. Off. | H04N 7/01 |
| WO91/20155 | 12/1991 | WIPO | H04N 5/14 |

OTHER PUBLICATIONS

Signal Processing of HDTV, 29 Feb.–Mar. 1988, pp. 345–354, Reuter et al., "Motion Vector Estimation for Improved Standards Conversion".
BBC Research Department Report No. 11, Sep. 1987, Tadworth, G. B., pp. 1–20, Thomas "Television Motion Measurement for DATV and Other Applications".
Signal Processing of HDTV, II; 30 Aug.–1 Sep. 1989; Turin, IT, pp. 649–655, Haghiri et al. "A motion Compensated Field Rate Conversion Algorithm".
Signal Processing Of HDTV; 29 Feb.–2 Mar. 1988; L'Aquila, IT, pp. 393–399 Fernando et al., "Motion Compensated Display Conversion".

*Primary Examiner*—Victor R. Kostak
*Attorney, Agent, or Firm*—Joseph S. Tripoli; Peter M. Emanuel; Richard G. Coalter

[57] ABSTRACT

Motion compensated video output signal (SO) produced by a soft switching or "fading" (SSW) between the a motion compensated interpolation (MCI) and a "fallback" mode (FFI) (e.g., intra-field), controlled by a "measure of confidence" (CF) in the reliability of the estimated motion vector. The confidence measure includes the following two components, namely: (i) a "basic confidence measure" (e.g., a block based, minimum motion estimation error (BME) and (ii) a measure based on the motion velocity or "speed" of movement of the motion vector or its horizontal (MVX) and vertical components (MVY).

19 Claims, 2 Drawing Sheets

METHOD AND APPARATUS FOR FORMING A VIDEO SIGNAL USING MOTION ESTIMATION AND SIGNAL PATHS WITH DIFFERENT INTERPOLATION PROCESSING

FIELD OF THE INVENTION

The present invention relates to a method and to an apparatus for forming a video signal using motion estimation and signal paths with different interpolation processing.

BACKGROUND OF THE INVENTION

The invention described here is part of a motion compensated field rate up-conversion system, where intermediate fields of a television picture, not at the present input, are calculated by means of motion compensated interpolation. A typical application is conversion between 50 Hz and 100 Hz television signals for display flicker reduction.

SUMMARY OF THE INVENTION

It is one object of the invention to disclose a method of selecting an interpolation mode in relation to a confidence measurement of the related motion vector.

It is a further object of the invention to disclose an apparatus which utilizes the inventive method.

In principle, every pixel in the intermediate fields can be the direct output of a motion compensated interpolator. In practice, however, there will always be areas of the picture where the motion is too fast or too complex to be estimated correctly. Patent application EP93 402505 of the applicant describes 'fallback processing' whereby a special non-compensated fallback mode or any comparable mode can be used in such areas.

The final output is in fact the result of a soft switch or fade between the motion compensated interpolation and the fallback mode, controlled by a measure of confidence in the reliability of the estimated motion vector. The confidence measure takes values between 0 and 1, where 0 (no confidence) selects the fallback mode only, and intermediate values mix linearly between the two.

Advantageously, the confidence measure includes the following two components: a 'basic confidence measure' which reflects the error in the motion measurement, and the measure based on the speed of movement.

In principle, the inventive method is suited for forming a video signal using motion estimation and signal paths with different interpolation processing, in particular motion compensated interpolation and fallback interpolation, whereby the output signals of said different signal paths are combined in relation to a measure of confidence which is derived from a minimum motion estimation error of the input video signal, which is in particular block based.

In principle the inventive apparatus for forming a video signal using motion estimation and signal paths with different interpolation processing, in particular motion compensated interpolation and fallback interpolation, includes:

motion compensated interpolation means and fallback interpolation means which receive said input video signal and the output pixel values of which are mixed in combining means in relation to a measure of confidence value which is derived in combining means from a block based minimum motion estimation error of the input video signal and from a related block motion vector or its components; and motion estimation means which calculate from said input signal, or motion information extractor means which extract from the transmitted input signal data stream, said block based minimum motion estimation error and said related block motion vector or its components.

BRIEF DESCRIPTION OF THE DRAWING

Preferred embodiments of the invention are described with reference to the accompanying drawings, which show in.

DETAILED DESCRIPTION

One method of motion measurement is "block based", that is, it is based on the movement of blocks of picture elements between a current and a previous location from field to field or frame to frame as distinguished from "pixel based" systems in which the motion of individual pixels is measured. For improved accuracy in block based systems, it has been proposed to employ block matching followed by localization using subblock matching, as described in EP-A-93402188.2 of the applicant filed Aug. 9, 1993. See also EP-A-93117661.4 filed Feb. 11, 1993 and U.S. patent application Ser. No. 08/303,337 entitled METHOD AND APPARATUS FOR MOTION ESTIMATION USING BLOCK MATCHING which was filed 8 Sep. 1994.

Such subblock matching process produces motion vectors whose components may be passed through a median filter. In calculating the motion vectors, the subblock matching process, or any other comparable process, generates an error (e.g. the sum of absolute, or the square of, difference values between the according pixel values in the two blocks used for matching) for each candidate motion vector and the vector giving the minimum error is chosen.

Figure 1:
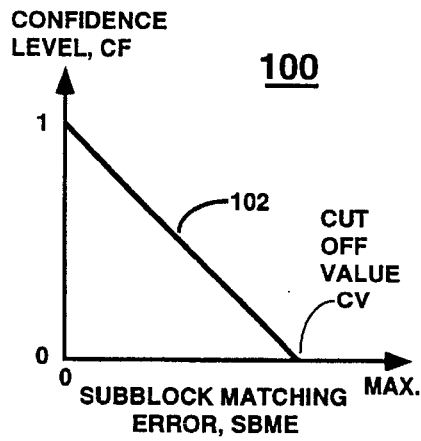
FIG. 1 is a diagram relating confidence level (CF) to subblock matching error (SBME) in accordance with an aspect of the invention.

It is the value of this minimum error which is used to calculate a basic measure of confidence according to the law illustrated in FIG. 1 which illustrates by diagram 100 confidence level CF as a function (segment 102) of subblock matching error SBME. If this subblock matching error SBME is zero, the confidence CF takes its maximum value of "1" (e.g., unity) as shown. As the error SBME increases to a cut-off value CV, the confidence decreases to its minimum value of zero. Other, similar relations (e.g. part of a sine or cosine function or a gaussian function) between subblock matching error and confidence may also be used for such limiting filter as an alternative to the linear relationship illustrated.

Figure 8:
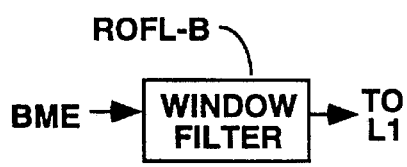

It is herein recognized, in accordance with an aspect of the invention, that one problem with the measure of confidence of FIG. 1 is that the subblock matching process usually generates high errors, leading to low or zero confidence, around the edge of an object moving over a detailed background. This means that the edge will be interpolated using the fallback mode, even though the motion vectors themselves correctly follow the edge. A solution to the foregoing, in accordance with another aspect of the invention, is to pass the subblock errors through a rank order filter, for example on a 3×3 window (e.g., as illustrated in FIG. 8). The filter may be a median filter or another rank order filter; for example a filter selecting the third highest error value in the window may be selected.

As used herein, the term rank order filter has its usual meaning of a filter which provides selection or classification on the basis of an ordering of values. A median filter, for example, is a rank order filter that selects that value of a set of values for which half of the remaining values are larger and the other half of the remaining values are smaller. Rank order filters differ in a significant respect from estimation filters (e.g., interpolators or averagers) in that the output is a real value equal to a specific input value and is not merely an estimation or approximation of a real input value.

Figure 2:
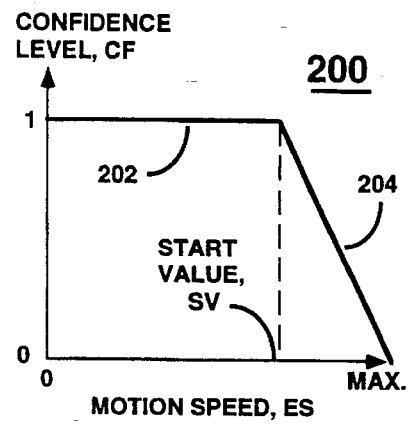
FIG. 2 is a diagram-relating confidence level (CF) to motion speed (ES) in accordance with another aspect of the invention.

Advantageously, the measure of confidence may be modified to take account of the speed (ES) of movement. The aim of this modification is to ensure that, as an object accelerates out of the range of motion speeds that can be estimated and coded with a motion vector, the interpolation switches smoothly into the fallback mode. An example of a suitable law that can be applied is given in FIG. 2. In FIG. 2, the function 200, comprising segments 202 and 204, illustrates confidence level CF as a function of the motion speed, ES. Again, other relations (e.g. part of a sine of a sine or cosine function or a gaussian function, different start value SV) between motion speed ES and confidence CF may be used rather than the piece-wise linear relationship shown.

The confidence/speed relationship may be applied to the true motion speed. Alternatively, it may be applied to the two motion vector components separately (e.g., the vertical or "Y" direction or horizontal or "X" direction) and then taking the minimum of the two components or some other combination of the two results. The result is combined with the main measure of confidence (e.g., FIG. 1, confidence vs matching error), for example by taking the minimum or by multiplication.

Figure 3:
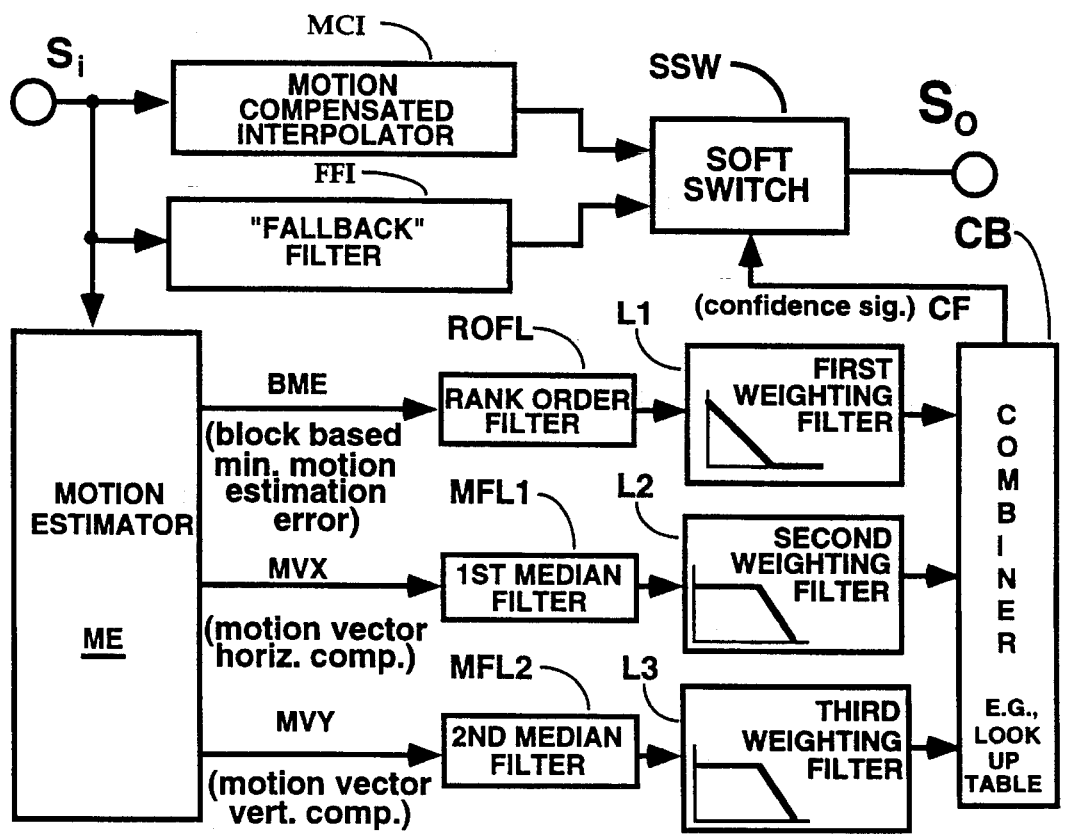
FIG. 3 is a block diagram of video signal processing system including confidence measurement and control in accordance with the principles of the invention.

In the confidence measurement circuit of FIG. 3 an input video signal $S_i$, e.g. 50 Hz, 2:1 or 60 Hz, 2:1, is fed to a motion compensated interpolator MCI, to a fallback filter FFI and to a motion estimator ME. A soft switch SSW combines or "blends" the output signals of interpolator MCI and filter FFI to produce the final output signal $S_o$ which may have the format 100/120 Hz, 2:1 or 50/60 Hz, 1:1. Switch SSW is controlled by a confidence signal CF coming from a combiner CB for determining the proportions of the interpolator and fallback filter signals that are combined to form the output signal $S_o$. Motion estimator ME calculates the block matching error BME, a horizontal component MVX of the related motion vector and a vertical component MVY of the related motion vector.

Figure 6:
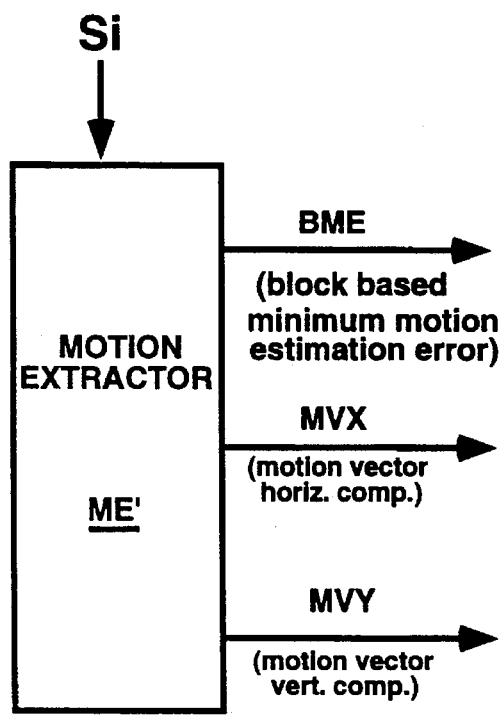

As an alternative to providing a motion estimator locally in the system, the motion error and vector component values may also be transmitted if the motion estimator ME is located within a transmitter and the circuit of FIG. 3 is part of a receiver, e.g. a TV receiver. Then, circuit ME may extract the matching error and/or the motion vector and/or its components from the transmitted input signal data stream. This modification is illustrated in FIG. 6 in which the input signal Si containing the block based minimum motion estimation error signal (e.g., the block matching signal) and the motion vector) is applied to the input of a motion extractor ME'. The motion information can also be used in the interpolator MCI if desired in a particular application.

Figure 7:
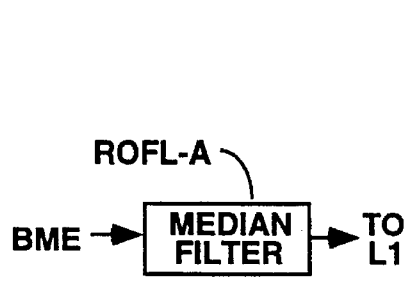

To continue, the block matching error signal BME passes through a rank order filter ROFL, for instance a median filter (or a 3×3 window, etc. as previously described) and a first weighting or "limiting" filter L1 operating according to the law or transfer function of FIG. 1 and is then fed into a combiner CB. FIGS. 7 and 8 illustrate the foregoing alternatives of using median and window filtering for the rank order filter ROFL. In FIG. 7 the rank order filter ROFL-A comprises a median filter. In FIG. 8 the rank order filter ROFL-B comprises a window filter. The horizontal motion vector component MVX passes through a first median filter MFL1 and a second weighting or "limiting" filter L2 operating according to the law (transfer function) of FIG. 2 and is then fed into combiner CB. As previously noted, curved rather than linear relationships may be used in the confidence vs black matching transfer function and the confidence vs motion speed transfer function.

The vertical vector component MVY passes through a second median filter MFL2 and a third weighting or "limiting" filter L3 operating according to the law or transfer function of FIG. 2 and is then fed into combiner CB.

Figure 4:
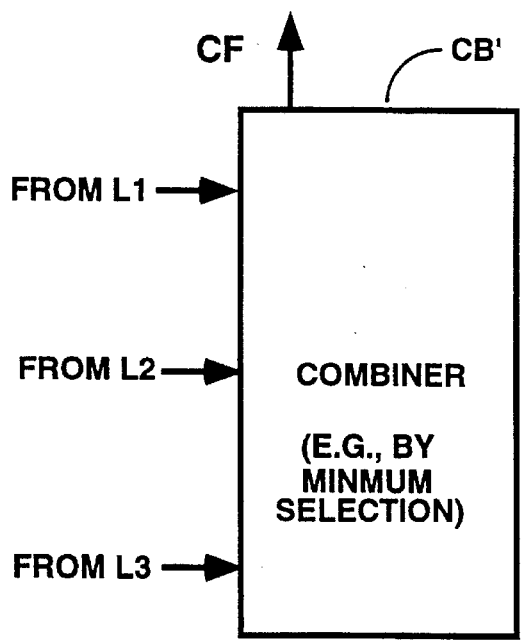
FIGS. 4, 5, 6, 7 and 8 are block diagrams illustrating modifications of the video signal processing system of FIG. 3.
Figure 5:
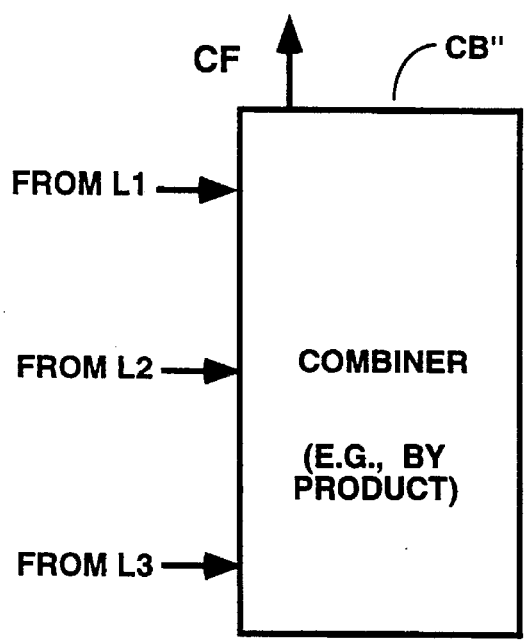

The combiner CB operates as described above and can work as a look-up table which is stored in memory means. Alternatives for the combiner CB include signal combining by minimum selection (as shown in FIG. 4) and by products (as shown in FIG. 5). The laws of filters L2 and L3 can be different (different function or start value SV). The laws represented by filter L1, L2 and L3 can be stored in look-up tables. Moreover, in case of specific picture data characteristics (e.g. camera/film mode) different laws can be selected or downloaded into the law of memories.

If the chrominance components are not controlled together with the luminance components by signal CF, they can be handled by separate means according to FIG. 3, having laws designed especially for the chrominance components.

Other advantageous application of the invention include it use in standards conversion, bit rate reduction, digital HDTV, digital VCR and MPEG1 or MPEG2 devices (IEC/ISO standard). In case of bit rate reduction the fallback processing may be intra-field coding.

What is claimed is:

1. A method for forming a video output signal (So) from a video input signal (Si) using motion estimation (ME) and signal paths with different interpolation processing comprising motion compensated interpolation (MCI) in one signal path and fallback interpolation (FFI) in the other path, comprising the steps of:

combining the output signals of the different signal paths (SSW) in relation to a measure of confidence (CF);

forming the measure of confidence from a block based, minimum motion estimation error (BME) of the video input signal (Si).

2. A method according to claim 1 wherein the step of forming the measure of confidence includes:

forming a block motion vector (MVX or MVY) from the video input signal (Si); and combining (CB) said block based minimum motion estimation error (BME) with the block motion vector (MVX or MVY).

3. A method according to claim 1 wherein the step of forming the measure of confidence includes:

forming a horizontal block motion vector (MVH) and a vertical block motion vector (MVY) from said video input signal (So); and combining (CB) said block based minimum motion estimation error (BME), said horizontal block motion vector (MVH) and said vertical block motion vector (MVY).

4. A method according to claim 1 further comprising the step of: filtering said block motion estimation error (BME) with a rank order filter (ROFL).

5. A method according to claim 2 further comprising the step of:
 filtering said block based minimum motion estimation error (BME) with a rank order filter (ROFL).

6. A method according to claim 3 further comprising the step of:
 filtering said block based minimum motion estimation error (BME) with a rank order filter (ROFL).

7. A method according to claim 5 further comprising the step of: median filtering (MFL1, MFL2) said block motion vector.

8. A method according to claim 6 further comprising the step of: median filtering (MFL1, MFL2) said horizontal block motion vector component and said vertical block motion vector component.

9. A method according to any of claims 3–8 further comprising the step of:
 subjecting at least one of said block based minimum motion estimation error (BME), said block motion vector, said horizontal component (MVX) of said block motion vector and said vertical component (MVY) of said block motion vector to limiting filtering (L1, L2, or L3) prior to said combining step.

10. A method according to any of claims 2–8 further comprising the steps of:
 subjecting at least one of said block based minimum motion estimation error (BME), said block motion vector, said horizontal component (MVX) of said block motion vector and said vertical component (MVY) of said block motion vector to limiting filtering (L1, L2, or L3) prior to said combining step; and
 wherein the step of combining comprises taking a minimum of the signals that are combined.

11. A method according to any of claims 2–8 further comprising the steps of:
 subjecting at least one of said block based minimum motion estimation error (BME), said block motion vector, said horizontal component (MVX) of said block motion vector and said vertical component (MVY) of said block motion vector to limiting filtering (L1, L2, or L3) prior to said combining step; and
 wherein the step of combining comprises taking a product of the signals that are combined.

12. A method according to any of claims 2–8 further comprising the steps of:
 subjecting at least one of said block based minimum motion estimation error (BME), said block motion vector, said horizontal component (MVX) of said block motion vector and said vertical component (MVY) of said block motion vector to limiting filtering (L1, L2, or L3) prior to said combining step; and
 wherein the step of combining comprises selecting confidence values from a look-up table.

13. Apparatus for forming a video signal ($S_o$) using motion estimation (ME) and signal paths with different interpolation processing, in particular motion compensated interpolation (MCI) and fallback interpolation (FFI), comprising:
 motion compensated interpolation means (MCI) and fallback interpolation means (FFI) coupled to receive said input video signal ($S_i$);
 combining means (SSW) for combining output signals of said motion compensated and fallback interpolation means in relation to a measure of confidence value (CF);
 combining means for deriving said measure of confidence value from a block based minimum motion estimation error (BME) of the video input signal (Si) and from a related block motion vector or its components (MVX, MVY); and
 motion estimation means (ME) for calculating from said input signal (Si), or motion information extractor means (ME) which extract from the transmitted input signal data stream, said block based minimum motion estimation error (BME) and said related block motion vector or its components (MVX, MVY).

14. Apparatus according to claim 13 further comprising:
 means (ROFL) for rank order filtering said block based minimum motion estimation error (BME) and for median filtering (MFL1, MFL2) said related block motion vector or its components (MVX, MVY) before being used in said combining means (CB) for forming said measure of confidence value (CF).

15. Apparatus according to claim 13 further comprising:
 filter means (L1, L2, L3) for applying limiting filtering to said block based minimum motion estimation error (BME) and to said related block motion vector or its components before being used in said combining means (CB) for forming said measure of confidence value (CF).

16. Apparatus according to claim 13 further comprising:
 means (ROFL) for rank order filtering said block based minimum motion estimation error (BME) and for median filtering (MFL1, MFL2) said related block motion vector or its components (MVX, MVY) before being used in said combining means (CB) for forming said measure of confidence value (CF); and
 filter means (L1, L2, L3) for applying limiting filtering to said block based minimum motion estimation error (BME) and to said related block motion vector or its components (MVX, MVY) before being used in said combining means (CB) for forming said measure of confidence value (CF).

17. A method as recited in claim 4 wherein said rank order filter (ROFL) comprises one of (i) a median filter (ROFL-A) and (ii) a window filter (ROFL-B).

18. A method as recited in claim 5 wherein said rank order filter (ROFL) comprises one of (i) a median filter (ROFL-A) and (ii) a window filter (ROFL-B).

19. A method as recited in claim 6 wherein said rank order filter (ROFL) comprises one of (i) a median filter (ROFL-A) and (ii) a window filter (ROFL-B).

* * * * *